United States Patent [19]

Martinesco

[11] 4,412,663
[45] Nov. 1, 1983

[54] MAGNETIC TAPE CASSETTE COMPRISING AN INDEXING DEVICE FOR THE UNWINDING OF THE TAPE

[76] Inventor: Dimitri M. Martinesco, Villa "Les Pins", Boulevard Maritime, 50270 Barneville Carteret, France

[21] Appl. No.: 309,891

[22] PCT Filed: Feb. 2, 1981

[86] PCT No.: PCT/FR81/00011

§ 371 Date: Oct. 7, 1981

§ 102(e) Date: Oct. 7, 1981

[87] PCT Pub. No.: WO81/02356

PCT Pub. Date: Aug. 20, 1981

[30] Foreign Application Priority Data

Feb. 8, 1980 [FR] France ............................... 80 02848
May 9, 1980 [FR] France ............................... 80 10506

[51] Int. Cl.³ .......................... G03B 1/04; G11B 15/32
[52] U.S. Cl. ..................................... 242/200; 360/132
[58] Field of Search ................................ 242/197–200; 352/72, 73; 360/72.1, 72.3, 93, 132; 116/298–300, 309, 318

[56] References Cited

U.S. PATENT DOCUMENTS

| | | | |
|---|---|---|---|
| 3,502,284 | 3/1970 | Loewenberg et al. | 242/199 |
| 3,734,052 | 5/1973 | Feldman | 242/199 |
| 3,894,507 | 7/1975 | Koechlin | 116/298 |
| 3,912,194 | 10/1975 | Chan | 242/199 |
| 3,913,200 | 10/1975 | Kossor | 242/199 X |
| 4,217,614 | 8/1980 | Balson | 360/132 |

*Primary Examiner*—Leonard D. Christian
*Attorney, Agent, or Firm*—Staas & Halsey

[57] ABSTRACT

A device for indexing the unwound length of a magnetic tape of a cassette, using a two-stage reduction gear which is driven by a reel of the cassette and which is formed of coaxial flat disks or rings nested in one another, two of which carry graduations adapted to pass by a fixed index of the cassette. The first reduction stage includes a ring (127) with an eccentric circular peripheral surface (128) carrying pins for engagement by the reel. The ring (127) is mounted for rotation in a first annular gear (101) with external gear teeth (105). The first annular gear (101) is mounted for oscillation with play about a fixed point. The first reduction stage also includes second annular gear (71) having internal gear teeth which mesh with the external gear teeth (105) of the first annular gear (101) and having an eccentric circular outer peripheral surface (73). The second reduction stage includes a third annular gear (51) with a circular internal surface (52) in which turns with play the second annular gear (71). The third annular gear (51) has external gear teeth (53) which mesh with the internal gear teeth (32) of a fixed external annular gear (31) surrounding the third annular gear (51).

18 Claims, 31 Drawing Figures

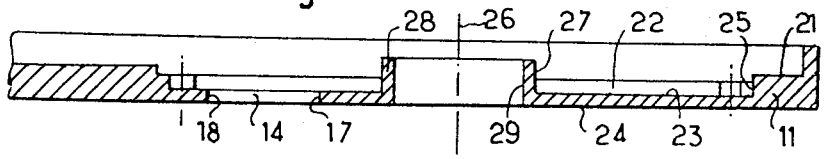
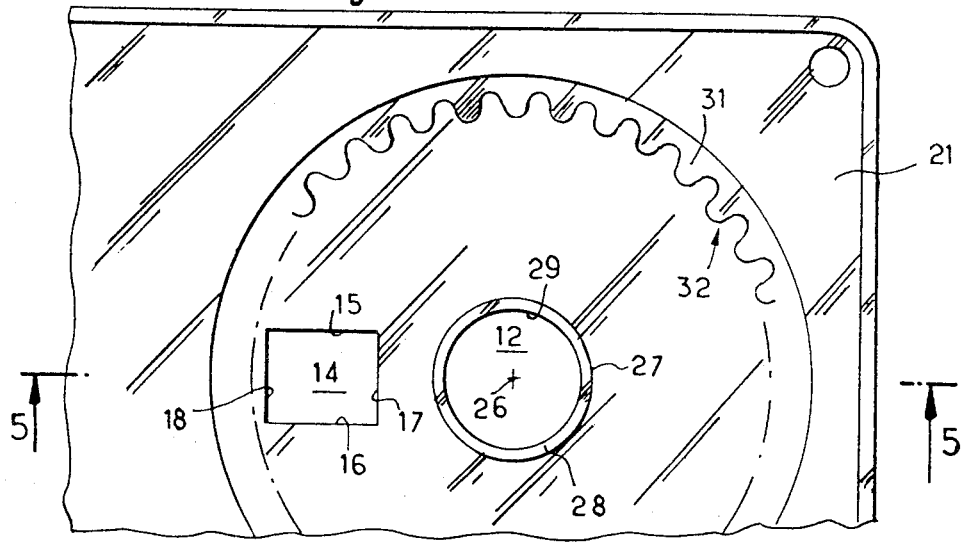
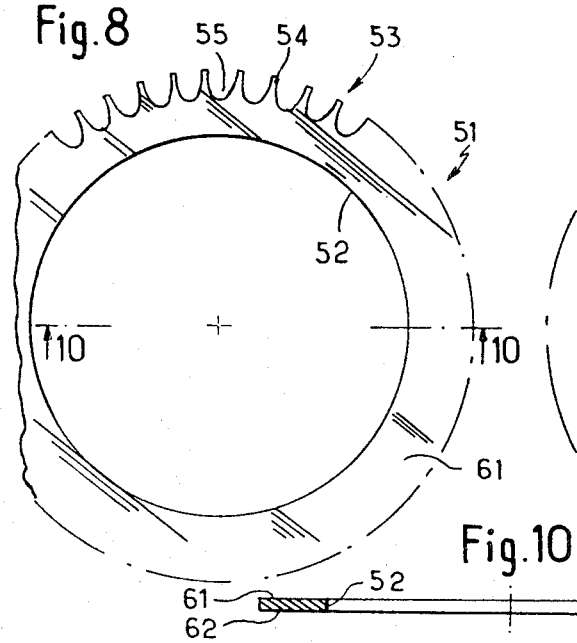
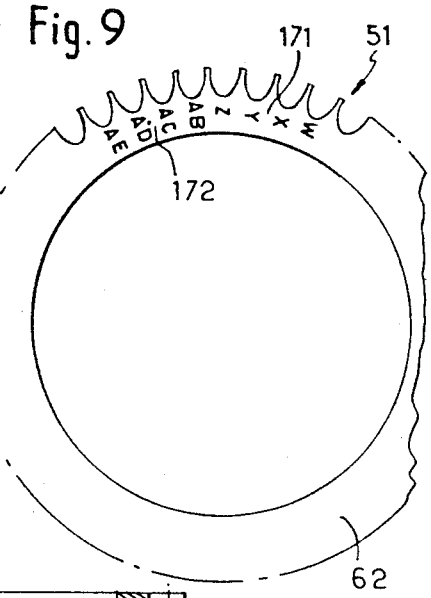

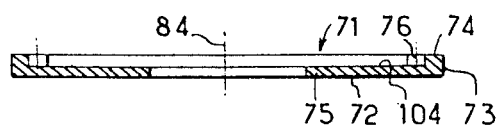
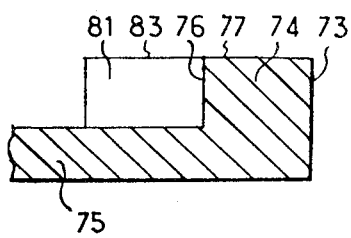
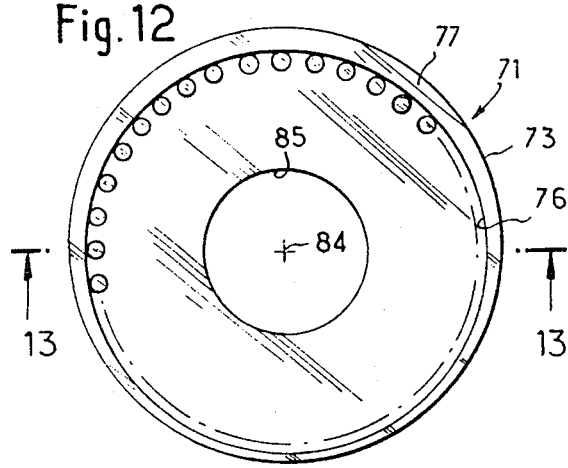
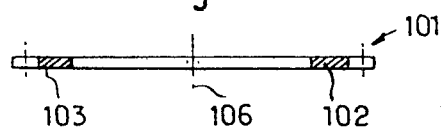
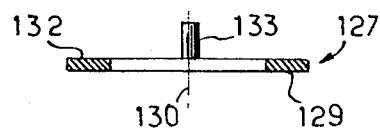
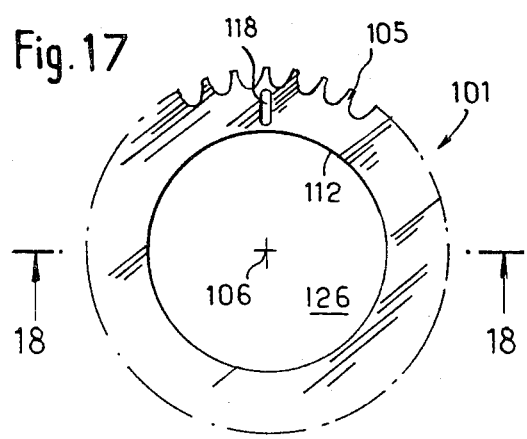
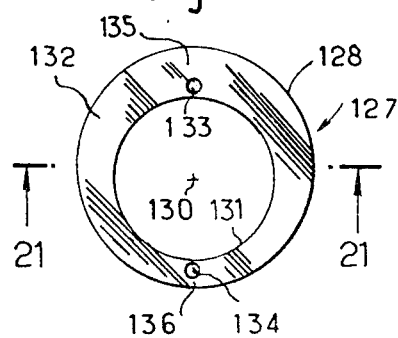

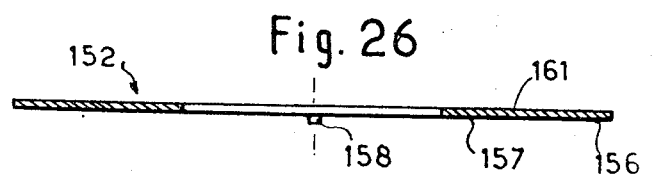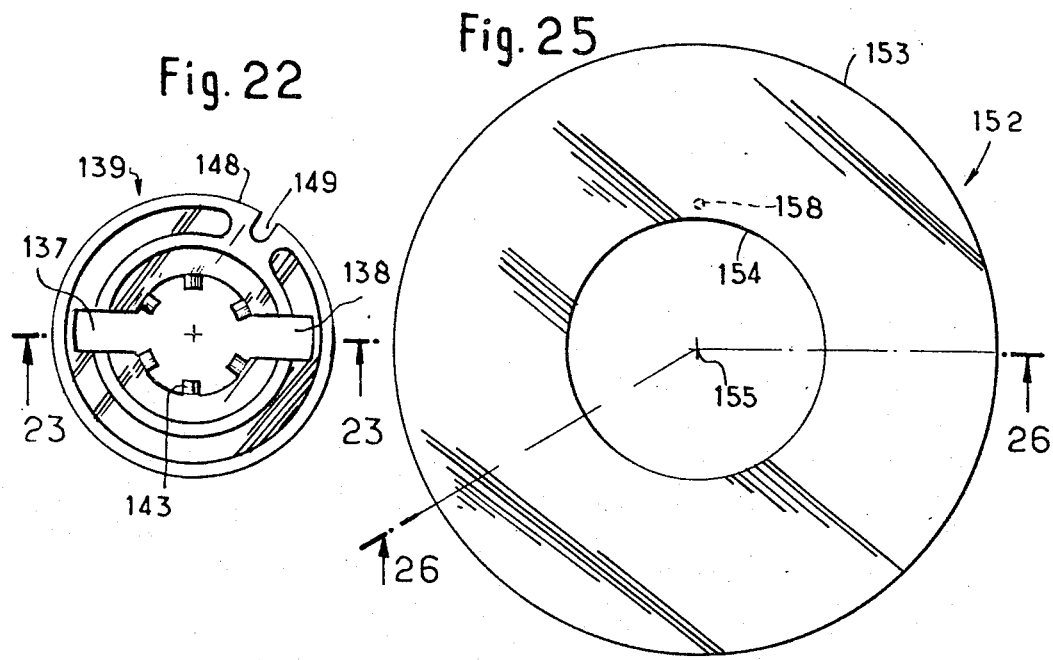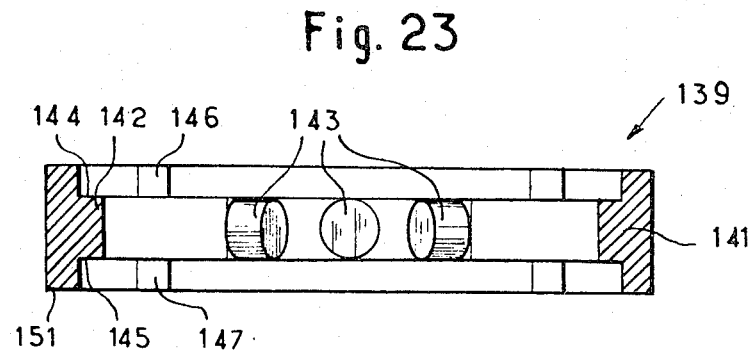

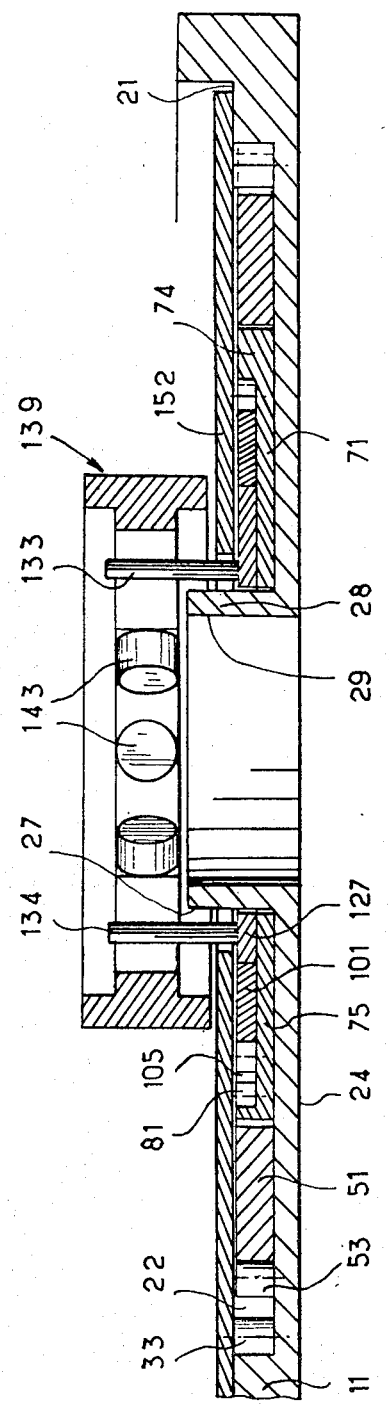

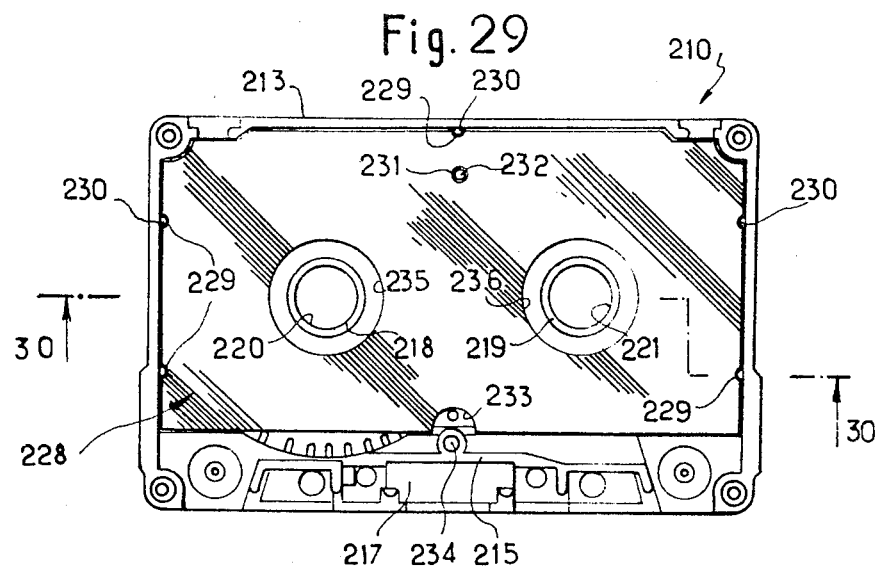
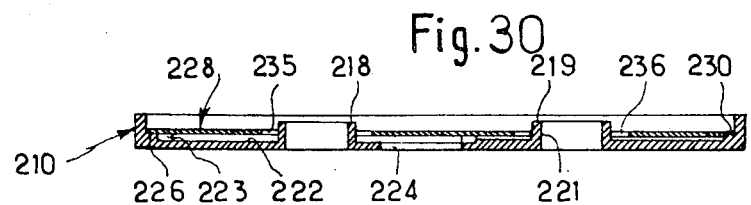
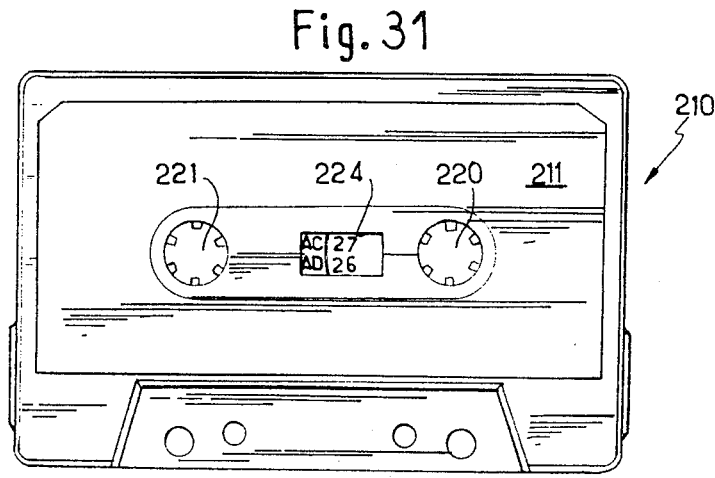

MAGNETIC TAPE CASSETTE COMPRISING AN INDEXING DEVICE FOR THE UNWINDING OF THE TAPE

BACKGROUND OF THE INVENTION

1. Technical Field

The invention relates to a magnetic tape cassette, for example a tape recorder or video tape cassette, which is provided with an indexing device for the unwinding of the magnetic tape.

2. Prior Art

Such cassettes are practical to use but one is very poorly informed at a given moment as to the part of the tape in the course of recording or reading. Rough information is drawn from the estimation of the length of tape which remains to be wound or unwound and that is by viewing through a window provided in the case of the cassette.

A less inaccurate means consists in providing the reading and/or recording apparatus with a counter connected to the drive mechanism for the tape. Still, for the indication of the counter to have a significance, on the one hand, the tape must be unwound from its origin, on the other hand, the counter must be reset at the start of unwinding. In addition, the drive mechanism and/or the connection with the counter customarily comprises a belt drive so that slipping is inevitable on starting and stopping and the indication of the counter is in practice inaccurate and unreliable.

Indexing devices for the unwinding of the magnetic tape are also known which are integrated or secured to the cassettes themselves and which at least in theory are intended to give a very accurate indication of the unwound length of magnetic tape.

It has nevertheless been found in practice that these devices are too bulky to be integrated into a standard cassette, in particular a tape recorder cassette, or do not have a sufficient gear ratio to permit the accurate indexing of a given zone of the magnetic tape, or are formed of elements mounted so that the friction forces between these elements are very much greater than the traction force normally applied to the magnetic tape to unwind it, thereby risking the jamming of the cassette, the tearing of the tape, etc.

SUMMARY OF THE INVENTION

An object of the invention is to avoid these drawbacks and to propose to this end an indexing device for the unwinding of the magnetic tape of a cassette which comprises a two-stage reduction gear adapted to be driven by a reel of the cassette and formed of coaxial flat disks or rings nested in one another, two of these disks or rings carrying graduations adapted to pass by a window in the case of the cassette.

According to the invention, the first reduction stage of the device comprises a ring with an eccentric circular peripheral surface carrying means for rotational driving by the reel and mounted for rotation in a first circular annular gear with external gear teeth itself mounted for oscillation with play about a fixed point, and a second annular gear having internal gear teeth meshing with the external gear teeth of the first annular gear and an eccentric circular outer peripheral surface, the second reduction stage of the device comprising a third annular gear with a circular internal surface in which the second annular gear turns with play and with external teeth meshing with internal teeth of a fixed external annular gear surrounding the third annular gear.

Surprisingly it has been found that the frictional forces of these various elements are extremely small and in any event are very much less than the traction force which is normally exerted on the magnetic tape for its unwinding. It has equally been found that this indexing device was very short in height and could thus easily be integrated into the case of a standard cassette.

BRIEF DESCRIPTION OF THE DRAWINGS

In the following description reference is made hereinbelow, by way of example, to the accompanying drawings in which;

FIG. 4 is a fragmentary view in plan on an enlarged scale of a half case before the mounting of the movable elements;

FIG. 5 is a sectional view taken on line 5—5 in FIG. 4;

FIG. 8 is a view of a gear with external teeth;

FIG. 9 is a view of the opposite side of said gear;

FIG. 10 is a sectional view taken on line 10—10 in FIG. 8;

FIG. 12 is a front view of a stud disk;

FIG. 13 is a sectional view taken on line 13—13 in FIG. 12;

FIG. 14 is an enlarged view of a part of FIG. 13;

FIG. 17 is a front view of a pinion adapted to cooperate with the disk;

FIG. 18 is a sectional view taken on line 18—18 in FIG. 17;

FIG. 20 is a front view of an eccentric flat ring;

FIG. 21 is a sectional view taken on line 21—21 in FIG. 20;

FIG. 22 is a front view of a reel;

FIG. 23 is a sectional view taken in line 23—23 in FIG. 22 but on a larger scale;

FIG. 24 is a vertical sectional view of a device according to the invention;

FIG. 25 is a front view of a disk forming a cover;

FIG. 26 is a sectional view taken on line 26—26 in FIG. 25;

FIG. 29 is a plan view illustrating this thin plate or sheet disposed in the half case of FIG. 27;

FIG. 30 is a sectional view taken on line 30—30 in FIG. 29; and,

FIG. 31 schematically illustrates a cassette according to the invention, comprising the indexing or measuring device for the unwound length of magnetic tape.

DESCRIPTION OF THE PREFERRED EMBODIMENTS

Figure 1:
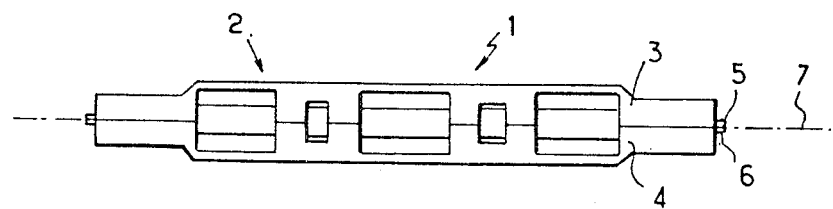
FIG. 1 is a front view along the longitudinal edge of a cassette.
Figure 2:
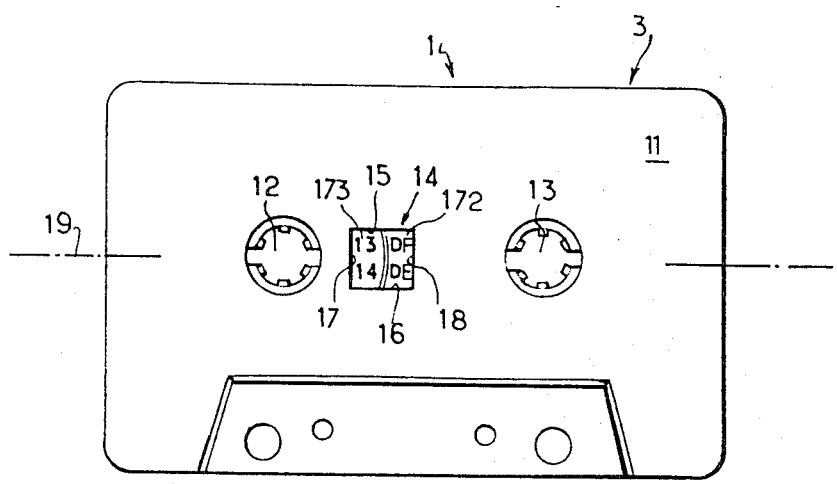
FIG. 2 is a plan view.

The tape-recorder cassette illustrated in FIGS. 1 and 2 has the customary parallelepipedic shape and strictly the same outer dimensions and the same disposition of elements for its use with customary tape recorders. It comprises a case 2 formed of two identical half cases 3 and 4 one of which forms the part sometimes called side 2 or B. The two half cases are assembled by their edges 5 and 6 situated in the central longitudinal plane 7 of the cassette.

The half case 3 has a front wall 11 of rectangular overall shape defining passages 12 and 13 for passage of the tape recorder members provided for winding and unwinding the magnetic tape. The wall 11, in addition, has a rectangular window 14 with edges 15, 16, 17, 18 symmetrical with respect to the central plane 19 perpendicular to plane 7.

Figure 3:
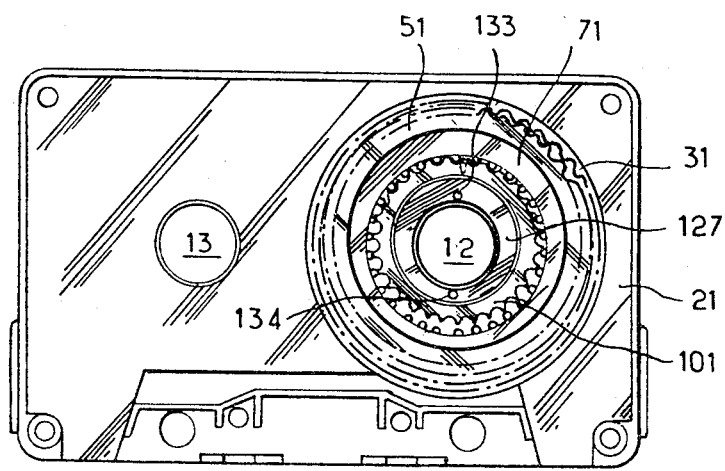
FIG. 3 is a view of the interior of a half case of a cassette, the reel having been removed.

The inner surface 21 (FIG. 3) of the wall 11 defines in the thickness thereof an annular recess 22 (FIGS. 4 and 5) limited by a plane surface 23 parallel to the outer surface 24 of the wall, by an outer cylindrical surface 25 the axis of which is the axis 26 of the passage 12 and by an inner cylindrical surface 27 which is the outer surface of a sleeve 28 obtained by molding with the half case 3 and also having axis 26. The inner surface 29 of said cylindrical sleeve also has axis 26.

Figure 6:
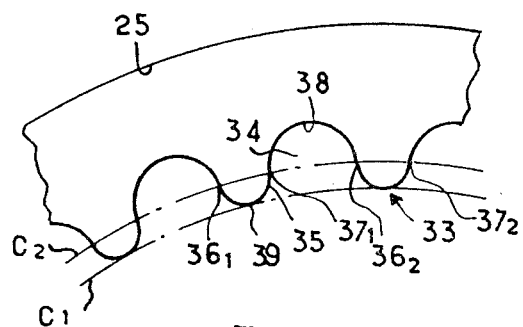
FIG. 6 is a view on an enlarged scale of teeth formed by a wall of the case.

From the outer cylindrical surface 25 depends an annular gear 31 having on its internal surface gear teeth 32. The gear teeth 32 are comprised of a plurality of teeth 33 (FIG. 6) regularly angularly distributed and separated from one another by inter tooth spaces 34. The teeth 33 are rounded. In the example they are fifty in number. Each front face 35 of a tooth 33 is, in transverse section, a semicircle between ends 36 and 37. The intertooth space 34 is defined by a concave surface 38.

In the example, the diameter of the semicircle limiting a front face, i.e., the distance separating the points 36 and 37, in one mm.

The distance between an end $37_1$ corresponding to tooth $33_1$ and the end $36_2$ corresponding to the neighboring tooth $33_2$ is two mm.

The diameter of the circle $C_1$ centered on the axis 26 and passing through the tips 39 of the teeth 33 is fifty mm. The diameter of the circumference $C_2$ passing through the points 36, 37 is therefore fifty-one mm.

Figure 7:
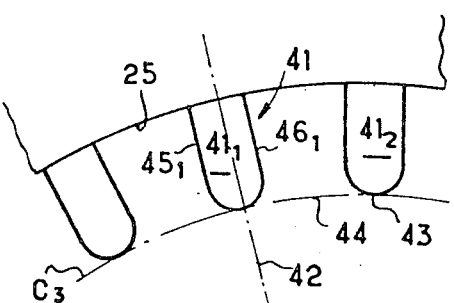
FIG. 7 is a view similar to FIG. 6 but for another embodiment.
Figure 11:
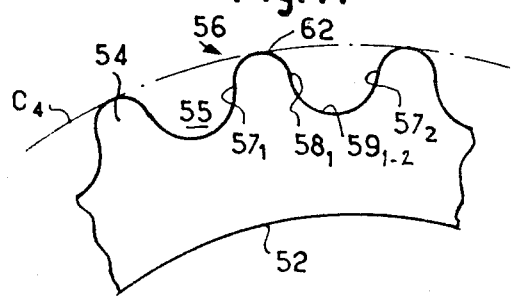
FIG. 11 is a view on an enlarged scale of part of said gear.
Figure 15:
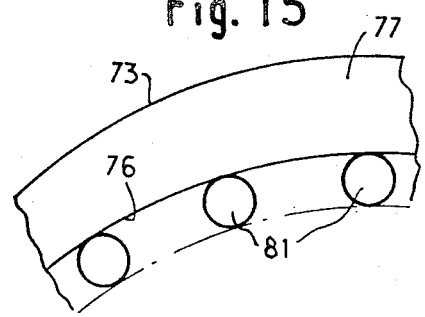
FIG. 15 is an enlarged view of a part of FIG. 12.

In the variant shown in FIG. 7, advantageously in the case of a cassette with a metal case, for example an alloy comprising aluminium, manganese and magnesium sometimes known by the name "Zamac", the gear teeth are comprised of a plurality of regularly spaced studs 41 of parallelepipedic shape with a radiating longitudinal plane 42 (i.e., passing through the axis 26) and the ends 43 which are opposite the surface 25 are rounded. The studs are obtained by molding with the half case.

In a form of construction the studs 41 are fifty in number. The circumference $C_3$ passing through the tips 43 of the studs has a diameter of fifty mm. The thickness of the studs, i.e., the distance separating their opposite faces 45 and 46, is one mm. The distance separating one face $46_1$ of the stud $41_1$ from the face $45_2$ of the following stud $41_2$ is about two mm. The height of each stud 41 is 1.2 mm. On the bottom 23 of the cavity 22 formed in the metal case a very thin sheet of cellophane is arranged.

On this sheet freely bears a gear 51 (FIGS. 8–11) advantageously of plastic material, with a smooth surface, in the shape of a flat ring with plane parallel sides 61 and 62 limited by a circular internal edge 52 and the external edge of which forms gear teeth 53.

The gear teeth 53 comprise a plurality of regularly spaced teeth 54 separated by intertooth spaces 55.

Each tooth 54 has a front face 56 in the shape of a semicircle with ends 57 and 58 connected to the concave line 59 limiting the intermediate space 55.

In the example, the teeth 54 are forty-nine in number, i.e., one unit less than the gear teeth 32 with which the gear teeth 54 are intended to cooperate.

The diameter of the circumference $C_4$ passing through the tips 62 of the teeth is fifty-one mm. The diameter of the half circumference forming the front face 56 is one mm. The distance between the ends $58_1$ and $57_2$ of the concave line $59_{1,2}$ is 2.3 mm. The circle 52 constituting the internal edge of the gear wheel 51 has a diameter of forty mm.

An eccentric stud disk 71 (FIGS. 12–15) has one plane face 72 in sliding contact with the internal surface 23 of the bottom 21 of the recess 22. Its outer cylindrical surface 73 is paired with the internal surface 52 of the gear 51. It has the same diameter as that of surface 52 while leaving the possibility of rotational displacement of the disk 71 with respect to the gear 51.

The disk 71 has an annular peripheral flange 74 of greater thickness than its central ring 75. The peripheral flange 74 is limited by the outer cylindrical surface 73 and the bottom 72 as well as a circular cylindrical inner surface 76 eccentric with respect to the outer cylindrical surface 73.

In the example the outer cylindrical surface 73 has a diameter of 40 mm and the inner cylindrical surface 76 with an axis 84 has a diameter of 37 mm. The largest width of the upper surface 77 of the flange 74 is two mm and its smallest width, diametrically opposite, is one mm. The height of the outer cylindrical surface 73 is 0.9 mm. The thickness of the flat ring 75 is 0.2 mm.

At the periphery of the annular central part 75 are cylindrical studs 81 which may be of circular cross-section, as illustrated, or even of another cross-section, the part of which turned toward the center is rounded. The front faces 83 of the studs 81 are level with the surface 71.

In the example, the studs 81 (FIG. 15) are thirty in number regularly angularly distributed about the center 84 of the inner surface 76 which is also that of the internal edge 85 of the flat ring 75. The diameter of each stud is one mm. The distance between the axes of consecutive studs is 3.55 mm. The diameter of the internal edge 85 of the eccentric stud disk 71 is the same as that of the inner cylindrical surface 27 of the sleeve, viz., thirteen mm, while leaving the possibility of said disk rotating relative to the sleeve.

Figure 16:
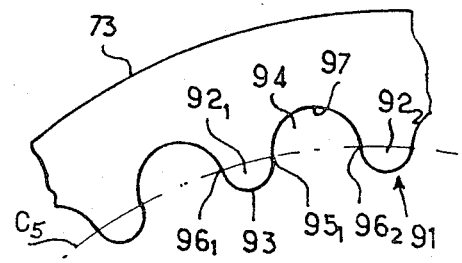
FIG. 16 is a view on an enlarged scale of a part of an eccentric disk for another embodiment.

In the variant shown in FIG. 16, the function of the studs 81 is carried out by gear teeth 91 comprised of a plurality of teeth 92 with front faces 93 rounded along a semicircle and limiting between one another intertooth spaces 94.

The teeth 92 are thirty in number. The diameter of the semicircle 93 is one mm. The distance between the ends $96_1$, $96_2$ of a curve 97 limiting an intertooth space 94 is 2.55 mm. The circumference $C_5$ on which the ends 95 and 96 of the teeth 93 lie has a diameter of thirty-four mm.

Figure 19:
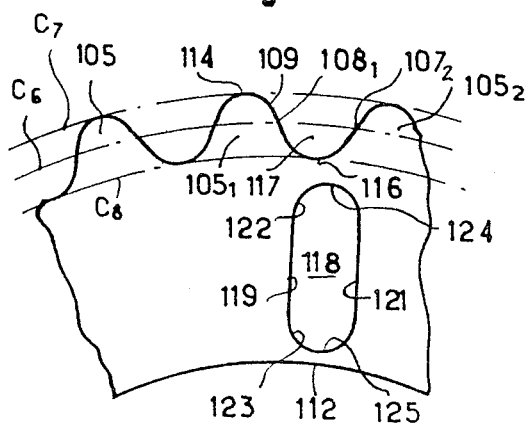
FIG. 19 is a view on a larger scale of a part of this pinion.

A pinion 101 (FIGS. 17-19) formed by a flat ring 102 is in sliding cooperation through its plane face 103 with the plane face 104 of the central zone 75 of the disk 71. The pinion has regularly angularly distributed teeth 105 about the center 106 of the flat ring which are twenty-nine in number in the example.

The configuration of the teeth 105 of the pinion 101 is similar to that of teeth 54 of gear 53. A front face 109 of a tooth is of semicircular shape the ends 107 and 108 of which are on a circle $C_6$ the center of which is the center 106 which is that of the circular internal edge 112 of the pinion. The diameter of the circle $C_6$ is thirty-three mm. The diameter of the circle $C_7$ passing through tips 114 of the teeth 106 is thirty-four mm. The diameter of the circle $C_8$ passing through the bottoms 116 of the intertooth spaces 117 is thirty-one mm. The distance between the neighboring ends $108_1$ and $107_2$ of the two consecutive teeth on the circle is 2.55 mm. The thickness of the flat ring, i.e., the height of its inner cylindrical surface 112, is equal to that of the recess which the eccentric disk 71 defines therefor, i.e., 0.7 mm. The diameter of the inner circumference of the flat ring 101, i.e., the cylindrical surface 112, is 23 mm.

The flat ring comprising the pinion 101 has a central through slot 118 limited by two radial edges 119 and 121 connected by semicircular fillets 122 and 123.

The width of the slot 118, i.e., the distance between the radial edges 119 and 121 is 1.1 mm. Its length, i.e., the distance between its tips 124 and 125, is four mm.

In the opening 126 which the pinion 101 defines is engaged an eccentric flat ring 127 the cylindrical external edge 128 of which has the same diameter as the cylindrical internal edge 112 of the flat ring 102. The lower plane surface 129 of the eccentric ring 127 rests against the surface 104 of the central annular zone 75 of the eccentric stud disk 71.

The diameter of the internal cylindrical edge 131 of the ring 127 (FIGS. 20-21) with axis 130 is 13 mm. This edge is eccentric with respect to the external edge 128, the largest width of said eccentric ring being 3.5 mm and its smallest width being 2 mm. From the plane upper surface 132 (in FIG. 21) of said eccentric ring depend diametrically opposite, perpendicular pins 133 and 134, erected in the widest zone 135 and the narrowest zone 136.

The pins 133 and 134 are provided for engagement with diametrically opposite radial notches 137 and 138 of a reel (FIGS. 23-25). The latter has an annular body 141 with a web 142 from which depend radial studs 143 for engagement with the takeup or drive member of the tape recorder. From the web 142 projects, on both sides 144 and 145, respective circular ribs 146 and 147. The periphery of the reel is comprised of a cylindrical rim 148, having a notch 149, which is used to receive the reel of magnetic tape.

The edge 151 of reel 139 is positioned to bear against a thin sheet 152 (see FIGS. 24-26) for example of plastic material, of the shape of an annular disk limited by an external circular edge 153 and an internal circular edge 154, both centered about an axis 155. The diameter (20 mm) of the edge 154 is sufficient to allow the pins 133 and 134 to pass. The diameter of its external edge 153 is sufficient to permit the glueing of the disk 152 by its peripheral zone 156 against the inner surface 21 of the wall 11 surrounding the recess 22, the sheet 152 thus acting as the cover for all the components of the device with the exception of the reel 139.

A perpendicular lug 150 integral with the lower face 157 of the sheet 152 is engaged in the slot 118 in the pinion 101. In the example, the diameter of the lug 158 is 1 mm. Its axis is at a distance of 14.5 mm from the center or axis 155.

On the side 62 of the gear 51 are radially inscribed graduations in numbers or letters each one of which corresponds to an intertooth space. There are provided, for example, a first part 171 of the graduations comprised of the succession of letters of the alphabet in their normal order, then a second part 172 of the graduations comprises of the succession of groups of two letters: AB, AC, etc. . . . AH, BD, BE, BF, etc. . . . EE, EF, . . . EP.

On a peripheral annular portion of the side 72 of the eccentric disk 71 is likewise provided a circular graduation 173 in the example comprised of the normal succession of numbers from 1 to 30.

Both of these graduations are visible through the window 14 as clearly shown in FIG. 2.

For assembly it is sufficient to dispose successively in the recess 22 the various elements which have been described, their maintenance being ensured by the glueing of the peripheral part of the disk 152 to the surface 21.

The half case 4 has a construction similar to that which has just been described for the half case 3.

If, for example, the cassette contains a magnetic tape which carries a succession of recordings, the beginning of each one of the recordings is indexed as follows: the cassette is mounted on the customary type of tape recorder and by fast movement of the tape recorder the tape is brought to the beginning of the recording. In this condition the initial graduations 171 and 172 are visible through the window 14. During the operation of the tape recorder, when the reel 139 turns, it rotationally drives the eccentric ring 127 by cooperation of pins 133 and 134 with notches 137 and 138. The magnetic tape is driven by one of the reels and unwinds from the other reel. Its edge moves against the upper side 161 of the cover 152. The flat ring 127 is guided in rotational movement by cooperation of its internal circular edge 131 with the outer surface 27 of the sleeve 28, both centered about the axis 26.

In the course of rotation of the flat ring 127, the external gear teeth of the pinion 101 progressively drive the eccentric disk 71 by its internal gear teeth 91 in the same direction as the ring 127 by pushing the teeth 92 and, after the flat ring 127 has completed a revolution, the condition is that in which the pinion 101 has resumed its initial condition but the disk 71 has turned a fraction of a revolution in the same direction as the ring 127. In the course of rotation of the pinion 101 the longitudinal axis of its slot 118 tilts with respect to the vertical first in one direction then in the other. In the example, the tilting angle is 6° in a direction and 6° in the other with respect to the vertical.

The operation of the reduction stage comprised of the gear 51 with gear teeth 53 and the fixed gear teeth 32 of the annular gear 31 is similar. The gear 51 acts as the pinion and its cooperation with the fixed gear teeth 32 causes it to turn about its axis in the opposite direction to the disk 71 and a fraction of a revolution each time the eccentric disk 71 turns a revolution. The eccentric disk 71 acts in the same way in this regard for this reducing stage as the flat eccentric ring 127 for the reducing stage considered above.

This succession of two reduction stages produces an overall reduction of a value which may be considerable since the reduction is effected in series. If N is the reduction ratio introduced by the first stage and N' the reduction ratio of the second stage, the reduction ratio of the device comprised of the combination of the two stages is N×N', each ratio being equal to the difference of the number of teeth of the two cooperating gear over the number of teeth of the gear comprising the greatest number of teeth.

The graduation scale 171, 172 carried by the gear 51 characterizes at each moment the number of revolutions by the stud disk 71. The combination of the two scales characterizes at each moment the length of magnetic tape which is unwound starting with the beginning of recording or reading.

As this indexing device is connected to the reel and to the cassette, the mere reading of the graduations of the scales gives exact information on the part of the tape in the course of reading or recording.

With such a cassette it is possible to select with accuracy not only a tune, but a phrase or a word and this by mere display. The cassette thus finds an advantageous use in data processing.

By choosing between the number of teeth or notches and the number of studs a difference not of one but two units, a more precise selection may be obtained if necessary.

The reduction device according to the invention permits, with a thickness of the order of several tenths of a millimeter, a very high factor of reduction to be obtained by exerting a minute mechanical resistance, the displacement of the component parts being effected by sliding. In addition, neither the construction nor the assembly requires close tolerances.

In the case of a metal case, the invention provides, for the purpose of lightening the weight, making the wall very thin, and using a cover which not only maintains the reduction mechanism in position as in the above-described embodiment, but which also acts as a sliding surface for the magnetic tape in the course of unwinding. The case and the cover may be made of nonmagnetic metal materials so as to avoid all magneto-electric effects which might be produced by the rubbing of the edge of the magnetic tape against the metal wall of the case or the cover.

Such an embodiment is illustrated in FIGS. 27–31 to which reference is made in the description which follows.

Figure 27:
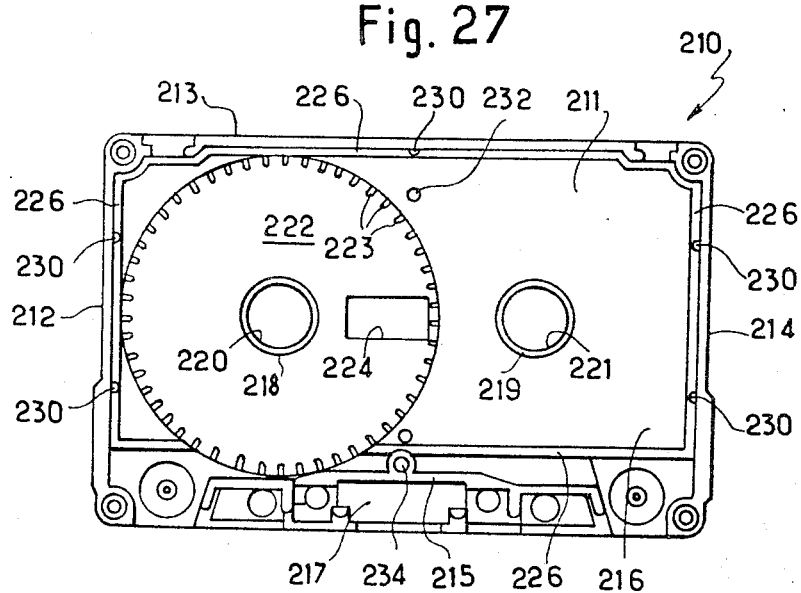
FIG. 27 is a plan view of the inner face of a half case of a cassette according to a variant of the invention.
Figure 28:
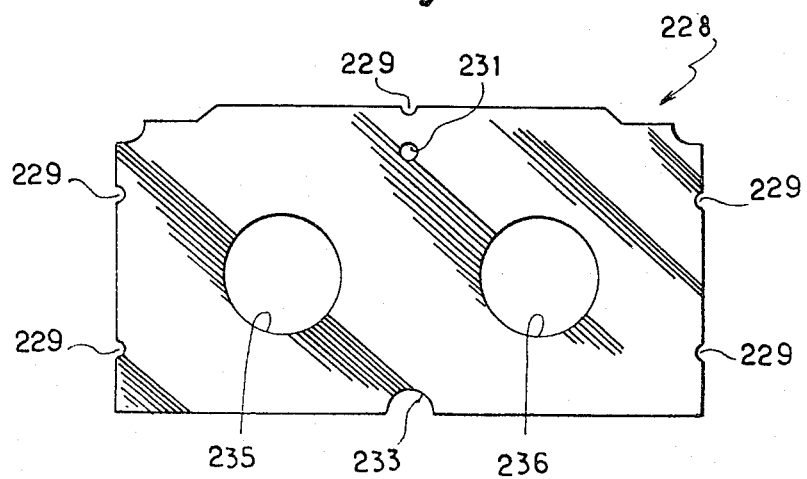
FIG. 28 is a plan view of a thin plate or sheet according to invention.

The case of a cassette is formed by the assembly of two substantially identical half cases of which one is illustrated in FIG. 27. This half case 210 comprises a flat rectangular wall 211 bordered on three sides by flanges 212, 213 and 214 and the fourth side forms a window for viewing the magnetic tape from outside the case. In the vicinity of the fourth side and along the same, the wall 211 has a molded projecting flange 215 forming a protective and shrouding shield for the magnetic tape. This flange 215 separates the interior surface of the half case 210 into two parts, one 216 forming the housing for the magnetic tape and its winding reels, the other 217 defining the zone of the displacement of the magnetic tape by the aforementioned window, usually comprising guide rollers and pressure pads.

The part 216 of the wall 211 of the half case has two cylindrical collars 218 and 219 projecting from the inner side of the wall 211, forming supports for the winding reels for the magnetic tape and defining holes 220 and 221 for the passage of the reel driving members.

Each half case is provided with a device for indexing or measuring the unwound length of the magnetic tape and comprises to this end a circular cavity 222 in the inner face of part 216 of wall 211 of the half case and comprising, at its periphery, studs 223 defining an annular gear with internal teeth. The annular gear is adapted to cooperate with a gear wheel of the device for indexing or measuring the unwound length of the tape. The wall 211 of the half case has a rectangular window 224 opening into this circular cavity 222, which is coaxial with one of the aforesaid holes, for example circular hole 220. The window 224 permits the display of the graduations carried by the two gear wheels of the mechanism for indexing and measuring the length of unwound tape (FIG. 31).

Part 216 of wall 211 of the half case 210 is bordered at its periphery by a rib 226 projecting from the inner face of the wall 211 which is formed along the three flanges 212, 213, 214 and extends along the protective and shrouding flange 215, slightly spaced therefrom. This rib 226 is substantially continuous along its entire periphery and is interrupted in the zone of intersection with the annular gear formed by studs 223. Advantageously, the tips of the latter are substantially at the same level as the tip face of the rib 226.

This rib 226 is adapted to support the periphery of a substantially rigid, thin plate or sheet 228 (FIG. 28) which is advantageously made of nonferrous metal. This plate 228 is of substantially rectangular shape and its contour corresponds to the contour of the wall 211 of the half case 210 which forms the housing for the magnetic tape and the winding reels. Its edges comprise semicircular cutouts 229 of small dimensions adapted to cooperate with tabs 230 projecting from the tip of the rib 226 for ensuring the positioning and the centering of the plate 228 on said rib 226. It may also comprise on its median transverse axis a hole 231 permitting the passage of a finger 232 projecting from the inner face of the wall 211 of the half case 210 as well as a circular cutout 223 of greater size on one of its long sides for the passage of a cylindrical tubular stud 234 projecting from the inner face of the wall 211 of the half case and tangent to the aforesaid flange 215, this tubular stud 234 serving for the assembling of the two half cases to each other.

The plate 228 also has two circular cutouts 235 and 236 permitting the passage of cylindrical collars 218 and 219 of the half case 210. These circular cutouts 235 and 236 have a diameter greater than that of the cylindrical collars to permit the driving of the indexing device by the winding reels for the magnetic tape.

When the plate 228 is mounted in place in the half case 210 (FIGS. 29 and 30) it is supported solely at its periphery by the rib 226 and substantially covers the entire surface of the part 216 of the half case 210 so as to substantially confine between it and this inner face a layer of air forming protection for the magnetic tape against variations in exterior temperature.

This plate 228, which replaces the sheet of plastic material with antistatic properties used in the prior art, has the same antistatic properties and also forms a sliding surface for the edge of the magnetic tape when the latter is unwound or wound on one of the reels.

This sheet 228 also forms a cover for the circular cavity 222 in which is accommodated the device for indexing or measuring the length of unwound tape and maintains this device in place in said cavity 222.

The other half case which is associated with the half case for forming the cassette of course comprises a thin plate or sheet 228 disposed in the manner which has just been described so that in the assembled cassette the magnetic tape and its reels are maintained between the two sheets 228 which are separated from the inner faces of the corresponding half cases and thus confine between them and the inner faces of the half cases a layer of air forming thermal insulation. The plates 228 are in contact with the half case solely through their peripheries bearing against the ribs 226 so that the thermal bridges between the half cases and the plates are extremely small and practically negligible.

What I claim is:

1. A standard magnetic tape cassette, comprising:
    a case having a fixed index;
    two reels housed in the case; and
    at least one indexing device means for indexing the tape length unwound from one of said reels, said indexing device means including a two stage reduction gear assembly formed of coaxial flat rings, two of which are provided with graduations adapted to pass by said fixed index,
    wherein the first reduction stage of the gear assembly includes a ring (127) provided with means (133, 134) for coupling said ring to said one of said reels so that said one of said reels rotationally drives said ring and having an eccentric circular peripheral surface (128), a first circular annular gear (101) mounted around said ring (127) and having external gear teeth (105), said first gear being mounted for oscillation with play about a fixed axis (158), and a second circular annular gear (71) rotatably mounted around said first gear and having internal gear teeth (81, 92) meshing with the external gear teeth of the first gear (101), said second gear (71) having an eccentric circular outer surface (73), and
    wherein the second reduction stage of the gear assembly includes a third circular annular gear (51) rotatably mounted with play around said second gear (71) and having external gear teeth (54), and a fixed external annular gear (31) surrounding the third gear (51) and having internal gear teeth (32) meshing with external teeth (53) of said third gear (51).

2. A cassette according to claim 1, wherein the graduations are carried by the second and third annular gears.

3. A cassette according to claim 1, wherein the second annular gear has a plane annular bottom, and the first gear and the ring are resting on said bottom.

4. A cassette according to claim 1, wherein the first annular gear has a radial slot, and said fixed axis is a fixed finger (158) received in the slot.

5. A cassette according to claim 4, further comprising a thin plate (152) covering the reduction gear assembly and carrying the finger (158).

6. A cassette according to claim 1, wherein said one of said reels has two radial opposite notches therein, and said means for coupling said ring to said one of said reels so that said one of said reels rotationally drives said ring comprises two fingers (133, 134) protruding from said ring and extending through said notches.

7. A cassette according to claim 1, wherein the number of teeth of the gear teeth meshing with one another differ by one.

8. A cassette according to claim 1, wherein said case has a wall provided with a recess formed in its inner face, said recess facing said one of said reels that drives the indexing device means, said indexing device means being contained in said recess.

9. A cassette according to claim 8, wherein said recess has a circular peripheral edge which is provided with gear teeth (32) forming said fixed external annular gear (31).

10. A cassette according to claim 8 or 9, wherein said recess is closed by said thin plate (152) having said finger (158), said thin plate being provided with a central hole and being fixed by its outer edge on the wall of the case around said recess.

11. A cassette according to claim 8, wherein the said recess has a bottom formed by the wall of the case, and said fixed index is a window in said bottom through which appear the graduations carried by the gears of the indexing device means.

12. A cassette according to claim 8, wherein the case wall forming the bottom of said recess is provided with a protruding cylindrical sleeve for centering the said coaxial flat rings of the indexing device means.

13. A cassette according to claim 1, wherein two rigid sheets of a material having antistatic properties are disposed within the case on either side of the tape, each one between an edge of the tape and a corresponding inner face of the case, and wherein said indexing device means is located between one of said rigid sheets and the corresponding inner face of the case and is maintained by said sheet in a recess of the case inner face.

14. A cassette according to claim 13, wherein said sheets are thin plates of nonferrous metal.

15. A cassette according to claim 13, wherein each rigid sheet is remote from the corresponding inner face of the case by a predetermined distance and a layer of air is confined between said inner face and the sheet for protecting the tape against variations in temperature.

16. A cassette according to claim 15, wherein each sheet is in contact solely at its periphery with the inner face of the case.

17. A cassette according to claim 16, wherein the inner face of the case comprises a discontinuous peripheral rib for its contact with said sheet and means for centering and positioning said sheet.

18. A cassette according to claim 1, wherein the case is of a nonferrous metal alloy.

* * * * *